United States Patent
Kojima et al.

(10) Patent No.: US 7,369,339 B2
(45) Date of Patent: May 6, 2008

(54) FAILURE PREDICTION METHOD FOR MAGNETIC DISK DEVICES, AND A MAGNETIC DISK DEVICE USING THE SAME

(75) Inventors: Akira Kojima, Kanagawa (JP); Toru Miyazaki, Kanagawa (JP); Kunihiro Nunomura, Kanagawa (JP); Takeshi Shikama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 456 days.

(21) Appl. No.: 11/193,925

(22) Filed: Jul. 28, 2005

(65) Prior Publication Data

US 2006/0034008 A1   Feb. 16, 2006

(30) Foreign Application Priority Data

Aug. 2, 2004   (JP) .............................. 2004-225465

(51) Int. Cl.
G11B 27/36 (2006.01)
G11B 5/09 (2006.01)
G06F 11/00 (2006.01)

(52) U.S. Cl. ............................ 360/31; 360/53; 714/47; 714/704

(58) Field of Classification Search ...................... None
See application file for complete search history.

(56) References Cited

U.S. PATENT DOCUMENTS 5,914,967 A * 6/1999 Yomtoubian ................ 714/718
6,697,976 B1 * 2/2004 Satoh et al. ................. 714/704
6,982,842 B2 * 1/2006 Jing et al. ..................... 360/31
2005/0246591 A1 * 11/2005 Johnson et al. ............... 714/47

FOREIGN PATENT DOCUMENTS

| JP | 06-214835 A | 8/1994 |
| JP | 07-248937 A | 9/1995 |
| JP | 2001-307435 A | 4/2000 |

* cited by examiner

Primary Examiner—Andrea Wellington
Assistant Examiner—Dan I Davidson
(74) Attorney, Agent, or Firm—Townsend and Townsend and Crew LLP; Patrick Duncan

(57) ABSTRACT

A warning against the possible failure is accurately sent from the magnetic disk device to a host device. In one embodiment, error indices per unit time are stored discontinuously/continuously for each magnetic head, and if the new index (partial integral error rate) updated with the stored multiple error indices as the items to be monitored satisfies required conditions, this state is diagnosed as an abnormality or a pseudo-abnormality, and reported to the host device. The partial integral error rate is updated with an increase in the number of sets of error indices. Each time a new set of error indices per unit time are stored, the oldest of the existing error indices to be monitored is discarded and one of the new error indexes is added. In this way, a new partial integral error rate is calculated from the fixed number of new sets of error indices to be monitored. When the partial integral error rate increases above a second required threshold, this state is reported as an abnormality to the host device since a failure is most likely to occur in the magnetic disk device.

8 Claims, 4 Drawing Sheets

1: Magnetic disk device SRAM
8: Accumulated values
9: Access data count
10: Error count
11: Error rate
12: First threshold
13: Latest hour
2: Read error rate
3: Write error rate
4: Seek error rate
5: Reassignment count
6: Startup count
7: Startup time-over event count
14: Cache
18: Table 1
21: Disk

Fig.2

|  | Table 1 | Table 2 | Table 3 | Table 4 | Table 5 |
|---|---|---|---|---|---|
| Bit error count | 2 | 1 | 4 | 5 | 2 |
| Access data count | 8GB | 9GB | 10GB | 12GB | 10GB |
| Bit error rate | 3.1E-11 | 1.4E-11 | 5.0E-11 | 5.2E-11 | 2.5E-11 |

| Table 6 | Table 7 | Table 8 | Table 9 | Table 10 |
|---|---|---|---|---|
| 5 | 5 | 5 | 6 | 6 |
| 9GB | 10GB | 12GB | 11GB | 10GB |
| 6.9E-11 | 6.3E-11 | 5.2E-11 | 6.8E-11 | 7.5E-11 |

· · ·

| Table 119 | Table 120 | Table 121 | Table 122 | Table 123 |
|---|---|---|---|---|
| 6 | 1 | 4 | 2 | 1 |
| 8GB | 9GB | 10GB | 9GB | 11GB |
| 9.4E-11 | 1.4E-11 | 5.0E-11 | 2.8E-11 | 1.1E-11 |

| Table 124 | Table 125 | Table 126 | Table 127 | Table 128 |
|---|---|---|---|---|
| 5 | 3 | 2 | 3 | 60 |
| 12GB | 10GB | 11GB | 10GB | 9GB |
| 5.2E-11 | 3.8E-11 | 2.3E-11 | 3.8E-11 | 8.3E-10 |

FAILURE PREDICTION METHOD FOR MAGNETIC DISK DEVICES, AND A MAGNETIC DISK DEVICE USING THE SAME

CROSS-REFERENCES TO RELATED APPLICATIONS

This application claims priority from Japanese Patent Application No. JP2004-225465, filed Aug. 2, 2004, the entire disclosure of which is incorporated herein by reference.

BACKGROUND OF THE INVENTION

The present invention relates to a method of diagnosing magnetic disk devices, and more particularly, to a magnetic disk device having a failure prediction function.

Trouble-free operation for three to five years on a 24-hours-a-day basis is usually guaranteed in the highly reliable magnetic disk devices that assume 24-hour operation. In actual operation, systems are usually shut down once or twice a year and periodic maintenance and checks encompassing the respective magnetic disk devices are performed during the shutdown.

These magnetic disk devices each have uniform performance, and their bit error rates and the frequency of occurrence of other error events remain low, even after a lapse of several thousands of hours from mounting of a new magnetic disk device(s) or from maintenance or replacement of existing ones. These bit error rates, for example, are as small as several bits per 10 gigabytes of data access.

Under conventional technologies, therefore, bit error rates and other error indices have been accumulated for fixed periods of time and if a count of any such error index exceeds the required threshold within the fixed period, this state has been reported to a host device. Additionally, instead of estimating the occurrence of a failure, the host device has compared a previously set value, e.g., a mean time between failures (MTBF), and the particular fixed period, and presented to the operator the information indicating the replacement time of the magnetic disk device.

The mounting environment for a magnetic disk device, however, is diverse, and physically, changes in ambient temperature or vibration due to a disturbance may render the internal spindle motor or actuator of the magnetic disk device abnormal, or electromagnetic noise internal or external to the device may result in the magnetic head itself or transmission circuits becoming abnormal. If these abnormal events actually happen, bit errors occur intensively or collectively at a certain time. In spite of the former abnormality not being able to be disregarded as a sign of a failure in the magnetic disk device, the abnormality has not been detectible with the conventional technologies.

In short, under conventional diagnosing methods, counts of the error indices which occurred until the required time had passed have been accumulated, then whether the accumulated respective counts of the error indices exceeded the required thresholds have been judged, and the particular event has been diagnosed as an abnormality only if the counts exceeded the thresholds. A mean time between failures (MTBF) has been adopted as the required time.

For these reasons, even if, in the course of passage of the required time, the spindle motor or the actuator temporarily became abnormal and there was an increase only in a specific count among all error index counts, the event has not been diagnosed as an abnormality since the rate of that count value was slight with respect to all error index data accumulated up to the passage of the required time. That is, the magnetic disk device has been placed under the situation where it is not replaced unless its performance deteriorates very significantly.

According to Japanese Patent Laid-Open No. Hei 6-214835, the occurrence rates of errors are cumulatively recorded in a memory for each peripheral device and each error cause, then the error information is transmitted to a central processing unit, and based on the transmitted error information and on the deterioration characteristics, operation time, and other factors of each peripheral device that are retained beforehand, the central processing unit predicts the occurrence time of permanent failures. Details of the prediction method are unknown.

According to Japanese Patent Laid-Open No. Hei 7-248937, the operation time of devices from their replacement or from their previous diagnosis is measured and if a mean time between failures, predetermined for each device, or other required time is reached, a self-diagnosing program is executed to suppress unnecessary self-diagnosis.

According to Japanese Patent Laid-Open No. 2001-307435, an error test for monitoring an error rate by deteriorating an S/N ratio is repeated for each fixed amount of data transfer, and thus the occurrence of a failure is predicted.

BRIEF SUMMARY OF THE INVENTION

It has been difficult for a conventional magnetic disk device to accurately send to a host device a warning notifying a failure to the operator. In a simple diagnostic approach where a threshold is set for the error index that is to be monitored and a warning (report) is then issued if the threshold is exceeded, false reporting frequently occurs or conversely the failure is missed. Too often monitoring causes overloading of the magnetic disk device due to increases in the amount of information handled. Failure prediction misses will occur if the amounts of magnetic disk device data transfer in response to each access operation are accumulated over an extended term and self-diagnoses are conducted.

With the conventional technology for totaling the amounts of magnetic disk device data transfer and then conducting self-diagnoses for each fixed amount of data transfer, the time when a failure is likely to occur cannot be accurately estimated since data transfer traffic disperses in terms of time.

A feature of the present invention is to eliminate abuses coupled with the accumulation of error indices (namely, overlooking a temporary abnormality or a sign leading to a failure). In the present invention, independent error indices per unit time are stored on each of multiple magnetic heads discontinuously/continuously, a new second error index to be updated with the above-stored multiple error indices as the items to be monitored is provided (hereinafter, this second error index is referred to as the partial integral error rate), and when the second error index satisfies required conditions, the particular event is diagnosed as an abnormality or a pseudo-abnormality, with the consequence that the results are reported to a host device.

In a preferred embodiment, during a unit time of one hour, error indices per fixed access data count or per fixed measuring time (nearly several tens of seconds) are stored in an associated condition with respect to the unit time. This is repeated on a unit time basis, whereby changes in the number of error indices on a unit time basis are stored discontinuously/continuously.

The bit error count, read error count, write error count, seek error count, reassignment count, startup count, startup time-over event count, and occurrence rates each of these errors/events, existing within the magnetic disk device, are adopted as error indices.

The partial integral error rate is to be taken to mean the value obtained using the contents of a fixed number (plurality) of sets of error indices mentioned above, for example, by dividing the sum of bit error counts by the sum of access data counts. The partial integral error rate is updated with an increase in the number of sets of error indices. Each time a new set of error indices per unit time are stored, the oldest of the existing error indices to be monitored is discarded and one of the new error indices is added. In this way, a new partial integral error rate is calculated from the fixed number of new sets of error indices to be monitored.

A storage element for storing error indices is, for example, a cache memory capable of storing, for example, a set of error indices equivalent to 128 unit time lengths, and each set of error indices is cyclically stored discontinuously/continuously in terms of time. A 129th unit time length of error index data onward is overwritten into the location of the storage element that corresponds to the first stored first unit time length of error index data.

A required count of data which was actually accessed during the unit time is stored in bytes as an access data count, one of error indices. In a preferred embodiment, 10 gigabytes of data is taken as the required access data count. If the required access data count is not reached during the unit time, a count of data actually accessed during a required measuring time shorter than any of existing unit time settings becomes the access data count to be used as an error index, and a count of the error bits which occurred during that measuring time is also used.

The error bit rate indicating how many error bits were detected in accessed data is calculated by dividing the number of error bits by the access data count, and the results are stored. For example, if 10 gigabytes of data is accessed during a unit time of one hour and five error bits are detected, the bit error rate in this case is: 5 bits÷$(10\times10^9\times8$ bits$)=6.25\times10^{-11}$.

Immediately after the bit error rate per unit time is confirmed and determined, this bit error rate is stored into an associated table and then the error index is judged whether it is in excess of a first required threshold. If the threshold is exceeded, this state is reported to a host device.

If the partial integral error rate tends to increase, i.e., if the partial integral error rate increases above a second required threshold, this state is reported as an abnormality to the host device since a failure is most likely to occur in the magnetic disk device.

Even if there is a tendency for the partial integral error rate to increase above its previous value (i.e., the partial integral error rate before being updated), provided that the second required threshold is not exceeded, this state is judged to be a temporary increase in the partial integral error rate. Consequently, the particular state is reported as a pseudo-abnormality to the host device.

If the partial integral error rate decreases below its previous value (i.e., the partial integral error rate before being updated), accumulation is started from the previous rate and each time an update operation is performed, the accumulated value of the partial integral error rates is judged whether it exceeds the second threshold. If this threshold is exceeded, cyclic trouble is regarded as having occurred in the magnetic disk device, and the cyclic abnormality is reported to the host device. If the second threshold is not exceeded, the accumulation is continued and when the accumulation of 128 unit time settings of data is completed, the accumulating function is terminated and the accumulated value is reset to its initial value. Instead of the second threshold, a third threshold may be set to compare accumulated values.

The host device can operate an algorithm which, with respect to the diagnostic results of a pseudo-abnormality, judges the particular state not to be abnormal. This makes it unnecessary to respond to false reporting. In addition, with respect to the diagnostic results of a cyclic abnormality, the host device sends, to the operator, cautionary information indicating that although the particular event does not lead to a failure in the magnetic disk device, replacement thereof is required.

Use of the partial integral error rate alleviates a temporary increase in bit error rate, thus making it easy to prevent false reporting.

Since error indices are stored using only a portion of the unit time, it is possible to prevent the occurrence of decreases in the original function of the magnetic disk device due to calculation of the error indices, and at the same time to store accurate error indices in a time-varying format.

When an error index exceeding the first required threshold is detected or calculated, it is possible to report this to the host device and to provide material for judging diagnostic results in the host device. Reporting to the host device is conducted only when the first required threshold is exceeded, and the information that the host device is to receive can therefore be carefully selected.

When the partial integral error rate exceeding the second or third required threshold is detected, this state is reported (warned) to the host device. The increase ratio of the partial integral error rate is calculated and if the required threshold is exceeded, this state is reported (warned) to the host device. Therefore, a magnetic disk device likely to fail within several hours can be detected without performance deterioration of that magnetic disk device, and a critical failure can be predicted. The above detection has been difficult with the conventional technologies.

The appropriate trigger for the host device to cope with an abnormal event can be given according to the particular degree of the abnormality. For example, when the occurrence of a critical failure is predicted, the data stored within one magnetic disk device may be restored into another magnetic disk device, whereby it becomes possible to prompt the host device to cope with the abnormality.

Proper setting of the required thresholds makes it possible to report error indices to the host device, accumulate the error indices, and predict a temporary or cyclic failure (or understand a particular event) using the error indices. When the unit time is one hour, this function conveniently works to diagnose the abnormality of magnetic disk devices due to environmental changes in a day.

BRIEF DESCRIPTION OF THE DRAWINGS

FIG. 2 is a diagram explaining the calculation of a partial integral error rate from details of stored error indices.

DETAILED DESCRIPTION OF THE INVENTION

Figure 4:
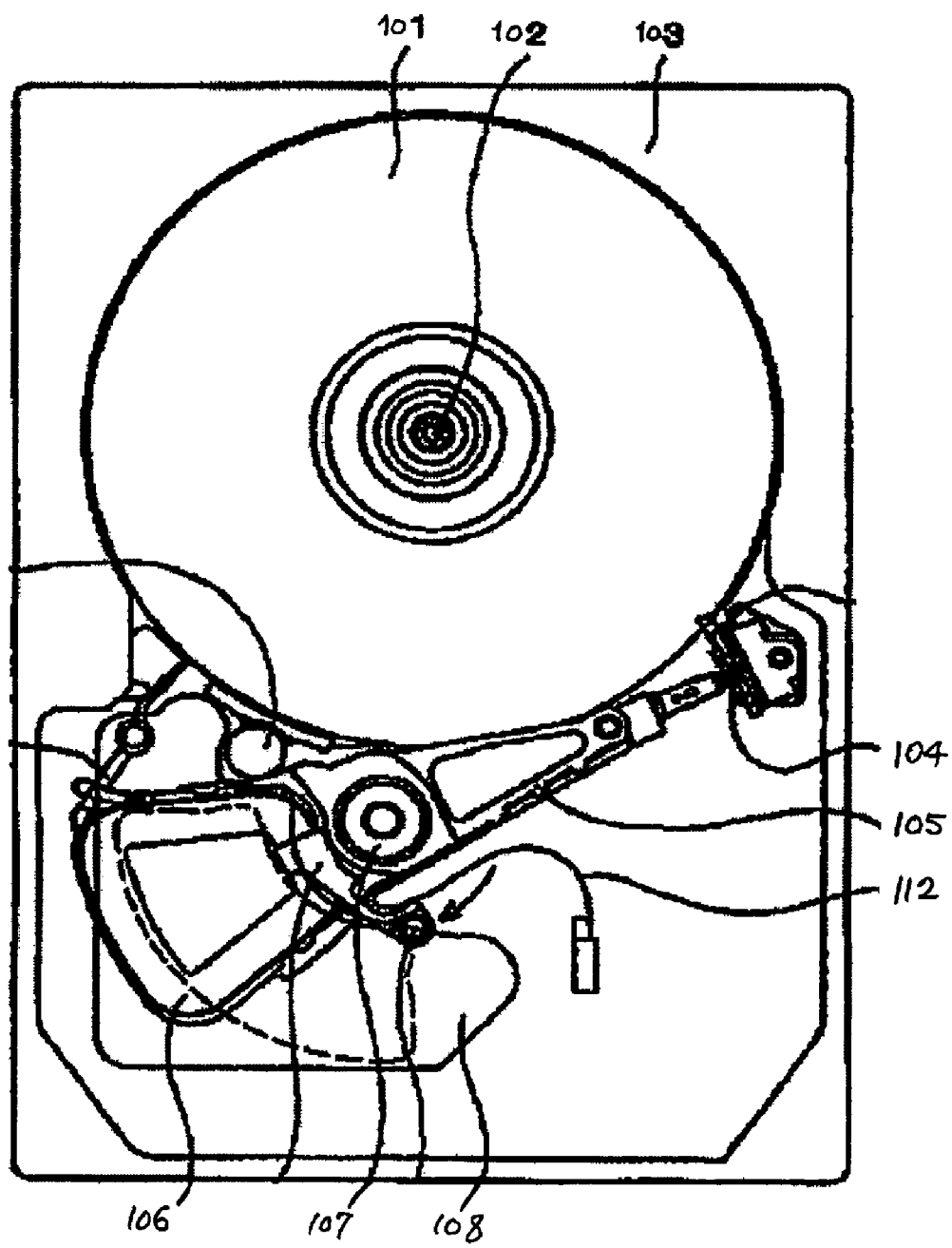
FIG. 4 is a diagram showing a configuration example of a magnetic disk device which applies the present invention.

A magnetic disk device applying the present invention is shown in FIG. 4. FIG. 4 is a plan view of the magnetic disk device with a cover removed. A magnetic disk medium 101 using glass or aluminum as its base material, is supported on a base 103 so as to be pivotable by means of a spindle motor 102. A carriage 105 having a magnetic head 104 at one end has a coil 106 at the other end and is supported on the base 103 such that the carriage 105 can be oscillated around a pivot 107 by a magnetic field of a voice coil motor (VCM) 108 and a magnetic field generated by energizing the coil 106.

Signals to or from the magnetic head 104 are communicated from a flexible printed-wiring circuit board FPC 112 to a printed-wiring board external to the base 103, via a head amplifier not shown. The printed-wiring board has a hard-disk controller (HDC), an interface circuit for control of information input to/output from the outside of the magnetic disk device, other control circuits, and a microprocessor. An SRAM, a cache memory, and other storage elements are also mounted on the printed-wiring board.

Figure 1:
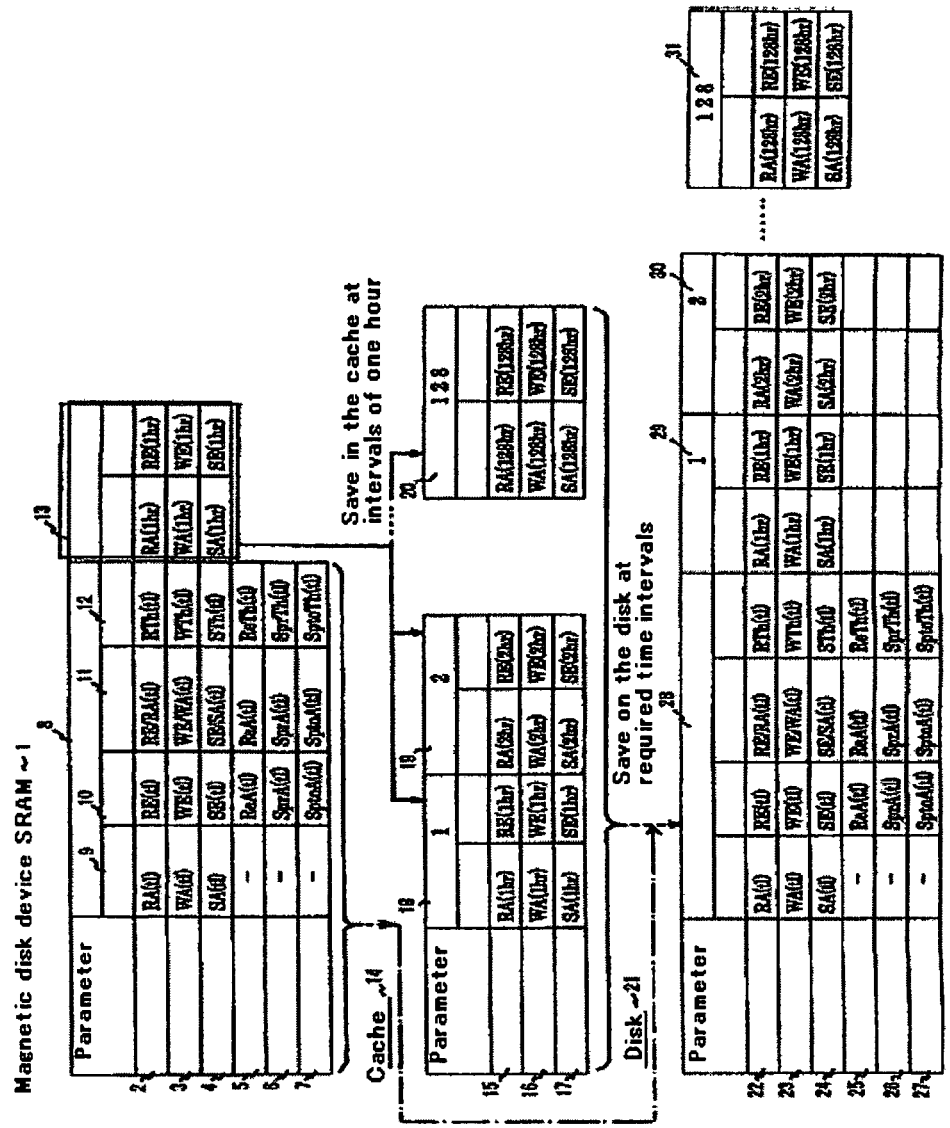
FIG. 1 is an explanatory diagram of error indices applicable in the present invention.

Next, error indices applicable in the present invention are shown in FIG. 1. A read error rate 2, a write error rate 3, a seek error rate 4, a reassignment count 5, a startup count 6, a startup time-over event count 7, and an accumulated value 8 of other error indices are saved in the SRAM 1 for each magnetic head mounted in the magnetic disk device.

Read, write, and seek error rates 11 are calculated from an access data count 9 and an error count 10, and if these error rates exceed a threshold 12 (first required threshold), this state is reported to a host device.

If one hour is set as a unit time, the read, write, and seek error rates and access data counts are temporarily saved in the SRAM 1 of the magnetic disk device for each latest unit time setting (one hour) 13, with the read, write, and seek error rates and access data counts taken as error indices. In this case, error indices per fixed access data count (10 gigabytes of data) or per fixed measuring time (nearly several tens of seconds) are stored during the unit time of one hour. One set of error indices are stored on a unit time basis. In this way, multiple sets of error indices are stored discontinuously/continuously. One set of error indices per unit time, including the access data count 9, error count 10, error rate 11, and other error indices, are shown at the left of the SRAM of FIG. 1.

Details of the error indices generated during the latest unit time of one hour are stored into a 128th table 20 of the cache 14. The error index details here mean a read error count, a write error count, a seek error count, and an access data count. Details of the error indices generated during a period from the latest two hours ago to one hour ago are stored into a 127th table (not shown). Similarly, details of the error indices generated during a period from the latest 126 hours ago to 127 hours ago are stored into a second table 19. Details of the error indices generated during a period from the latest 127 hours ago to 128 hours ago are stored into a first table 18.

In this way, new required sets of error indices, 18 to 20, are stored into the cache memory 14 discontinuously/continuously with the elapse of time. Upon determination of the error indices per unit time, these error indices are stored into an associated table, and the magnetic disk device judges whether the error indices exceed the first threshold. If the threshold is exceeded, this state is reported to the host device.

If there is a tendency for a partial integral error rate to increase, i.e., if the partial integral error rate increases above a second required threshold, this state is reported as an abnormality to the host device since a failure is most likely to occur in the magnetic disk device.

Even if the partial integral error rate increases above its previous value (i.e., the partial integral error rate before being updated), provided that the second required threshold is not exceeded, this state is judged to be a temporary increase in the partial integral error rate. Consequently, the particular state is reported as a pseudo-abnormality to the host device.

The partial integral error rate is to be taken to mean the value obtained using the contents of a fixed number (plurality) of sets of error indices mentioned above, for example, by dividing the sum of bit error counts by the sum of access data counts. The partial integral error rate is updated with an increase in the number of sets of error indices. Each time a set of new error indices per unit time are stored, the oldest of the existing error indices to be monitored is discarded and one of the new error indices is added. In this way, a new partial integral error rate is calculated from the fixed number of new sets of error indices to be monitored.

Among error indices, a read error rate 15, a write error rate 16, a seek error rate 17 are each calculated during the unit time and stored. More specifically, the read error rate is calculated by dividing the number of error bits by the number of bits in accessed data. The write error rate and the seek error rate are calculated by dividing the number of errors by the number of write operations or seek operations, respectively.

The unit time can be changed as appropriate, and it can be, for example, 30 minutes or two hours. Also, the total number of tables can be increased/reduced according to the memory capacity used. Error indices that were stored into the cache 14 may be recorded on the magnetic disk medium as appropriate. Preferably, a time zone in which a count of actually accessed data is not large may be predetermined from the error indices that were reported to the host device, and in this time zone, error indices may be recorded on the magnetic disk medium from the cache 14. Alternatively, the first or second threshold may not require storage into a table.

FIG. 2 is a diagram explaining how, in read operation or write operation, the partial integral error rate is calculated from details of stored error indices. The number of errors and error rate shown in FIG. 1 are taken as a bit error count and a bit error rate, respectively, in FIG. 2. Description is given of a case in which the error count and access data count up to the latest hour ago are confirmed and determined on a unit time basis.

A threshold to be used when a count of data actually accessed during the unit time is 10 GB and the bit error count during this time is 2000, is taken as a first required threshold, and a bit error rate to be used in this case is set. That is to say, the first threshold is: $2{,}000 \text{ bits} \div (10 \times 10^9 \times 8 \text{ bits}) = 2{,}500 \times 10^{-11}$.

Immediately after the contents of tables 1 to 128 in FIG. 2 are confirmed and determined, the bit error rates in these tables are each compared with the first threshold value of $2{,}500 \times 10^{-11}$. If either of the bit error rates exceeds the first threshold value, this state is reported to the host device. The contents of the relevant table, and all or part of other error index data, are also reported. The first threshold can be greater or smaller than the above value, and an appropriate value can be set as required.

Figure 3:
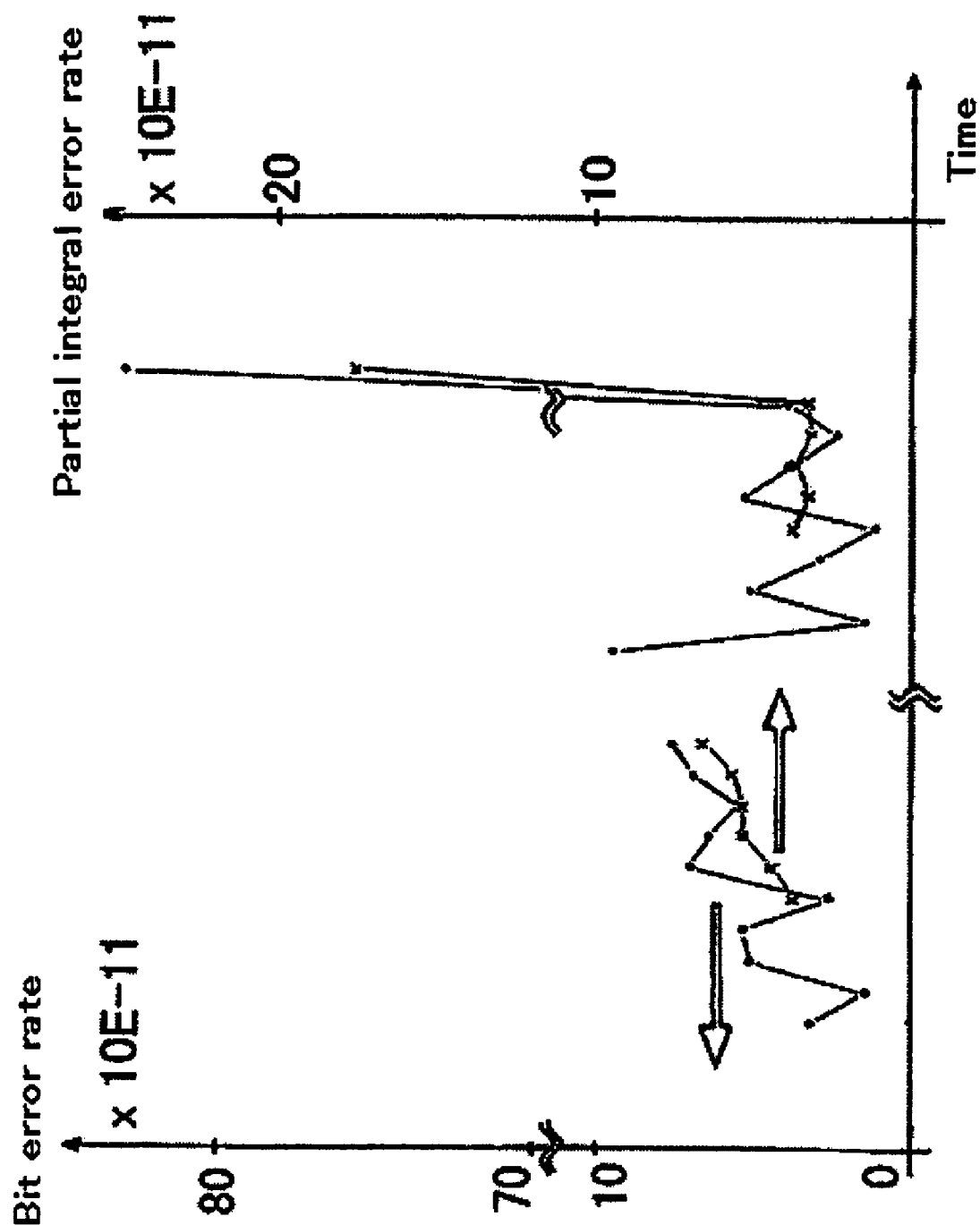
FIG. 3 is a graph showing time-varying changes in bit error rate and partial integral error rate, both rates being among the error indices shown in FIG. 2.

FIG. 3 is a graph showing time-varying changes in bit error rate and partial integral error rate, both rates being among the error indices shown in FIG. 2. The bit error rate values in the tables 1 to 128 of FIG. 2 are each shown in a plotted form with a dot (in the graph, some of the tables are omitted and the left curve on the vertical axis represents changes in the bit error rate). A sudden increase in the bit error rate is shown since the bit error count increased to 60 in the table 128. Under the conventional technologies, one threshold has been used and an appropriate threshold value has been difficult to set.

A partial integral error rate is obtained by selecting, for example, five of the above dot-marked plots, as the bit error counts to be monitored, and then dividing the sum of these selected bit error counts by the sum of access data counts (in the graph, the right curve on the vertical axis represents changes in the partial integral error rate). The thus-obtained values are each shown as "x" in a plotted form. The partial integral error rate including the table 128 increased to $17.6 \times 10^{-11}$.

The partial integral error rate is updated with an increase in the number of sets of error indices. Each time a new set of error indices per unit time are stored, the oldest of the existing error indices to be monitored is discarded and one of the new error indices is added. Thus, in the present embodiment, a new partial integral error rate is calculated from five new bit error counts to be monitored.

Accordingly, if the bit error count of 60 in the table 128 indicates a temporary increase, since the bit error count of a table 129 that is overwritten on the value of the table 1 returns to several bits, the value of the partial integral error rate approaches $17.6 \times 10^{-11}$. Conversely, if the bit error count indicates a critical increase, the bit error count value in the table 129 becomes slightly smaller than or exceeds that of the table 128. As a result, the partial integral error rate significantly increases and thus goes beyond the second threshold (for instance, $30 \times 10^{-11}$).

The partial integral error rate is described below using a simplified example. Consider a table make-up similar to that of FIG. 2. Also, assume that in tables 1 to 127, all bit error counts are 5, all access data counts, 10 GB, and all bit error rates, $6.25 \times 10^{-11}$. Additionally, assume that the bit error count, access data count, and bit error rate in table 128 only are 60, 10 GB, and $7.50 \times 10^{-10}$, respectively.

A set of 10 error indices is selected as the indices to be monitored, then the sum of these bit error counts is divided by the sum of access data counts, and the results are taken as the partial integral error rate. The sum of the 10 successive sets of access data counts in the tables 118 to 127 is 100 GB. The sum of the 10 sets of bit error counts is 50, which is not in excess of a bit error count of 100 equivalent to, for example, the second threshold.

In this case, 60 bit errors that were caused by changes in ambient environment, temporary vibration of the spindle motor, a temporary decrease in the readout capability of the magnetic head, and other unusual events, during the latest unit time of one hour, are stored within the table 128. When 10 sets of error indices, in the tables 119 to 128, are selected as the indices to be monitored, the sum of bit error counts for a total access data count of 100 GB becomes 105, which is in excess of the second threshold. This state is therefore reported to the host device.

Under the conventional technology that adopts long-term accumulated values as the indices to be monitored, since the sum of 128 unit time zones of data has been employed to divide the sum of bit errors, the resulting value has not reached a second threshold equivalent to 100 bit errors for 100 GB of access, and reporting to a host device has not been conducted.

In an electronic apparatus that uses magnetic disk devices, since highly accurate prediction reports on failures are issued from the magnetic disk devices, the prediction reports are useful for improving the electronic apparatus in reliability.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A failure prediction method for magnetic disk devices, comprising:
    a first step of, during a period from the start of a unit time to the end thereof, storing first error indices concerning a magnetic head, in increments of a fixed amount of access or at fixed measuring time intervals;
    a second step of calculating a second error index on the basis of a fixed number of sets of first error indices stored by repeating said first step a plurality of times;
    a third step of, during the period from the start of a unit time to the end thereof, storing third error indices concerning the magnetic head, in increments of a fixed amount of access or at fixed measuring time intervals; and
    a fourth step of, by discarding the chronologically oldest set of error indices among the fixed number of sets of first error indices used as a basis for the calculation in said second step, updating the second error index on the basis of a fixed number of sets of error indices, including the set of third error indices, obtained in said third step.

2. The failure prediction method for magnetic disk devices according to claim 1, wherein, if any one of the first error indices stored in said first step or any of the third error indices stored in said third step exceeds a first threshold, a signal meaning that the particular error index has exceeded the first threshold is sent to a host device.

3. The failure prediction method for magnetic disk devices according to claim 1, wherein, if the second error index calculated in said second step or the second error index updated in said fourth step exceeds a second threshold, a signal meaning that the particular error index has exceeded the second threshold is sent to a host device.

4. The failure prediction method for magnetic disk devices according to claim 1, wherein part or all of bit error rate, read error rate, write error rate, seek error rate, reassignment count, startup count, and startup time-over event count data, is used as error indices.

5. A magnetic disk device comprising:
    a magnetic head;
    a magnetic disk medium; and
    a hard-disk controller configured to:
    (1) during a period from the start of a unit time to the end thereof, store first error indices concerning the magnetic head, in increments of a fixed amount of access or at fixed measuring time intervals;

(2) calculate a second error index on the basis of a fixed number of sets of first error indices stored by executing said (1) a plurality of times;

(3) during the period from the start of a unit time to the end thereof, store third error indices concerning the magnetic head, in increments of a fixed amount of access or at fixed measuring time intervals; and (4) by discarding the chronologically oldest set of error indices among the fixed number of sets of first error indices used as a basis for the calculation in said (2), update the second error index on the basis of a fixed number of sets of error indices, including the set of third error indices, obtained by said (3).

6. The magnetic disk device according to claim 5, wherein, if any one of the first error indices stored by said (1) or any one of the third error indices stored by said (3) exceeds a first threshold, said magnetic disk device sends to a host device a signal meaning that the particular error index has exceeded the first threshold.

7. The magnetic disk device according to claim 5, wherein, if the second error index calculated by said (2) or the second error index updated by said (4) exceeds a second threshold, said magnetic disk device sends to a host device a signal meaning that the particular error index has exceeded the second threshold.

8. The magnetic disk device according to claim 5, wherein part or all of bit error rate, read error rate, write error rate, seek error rate, reassignment count, startup count, and startup time-over event count data, is used as error indices.

* * * * *